US012192293B2

(12) United States Patent
Wang et al.

(10) Patent No.: US 12,192,293 B2
(45) Date of Patent: Jan. 7, 2025

(54) METHOD AND APPARATUS FOR IMPROVING SERVICE DISCOVERY

(71) Applicant: Telefonaktiebolaget LM Ericsson (publ), Stockholm (SE)

(72) Inventors: Cheng Wang, Shanghai (CN); Huiping Ding, Shanghai (CN); Xiao Li, Shanghai (CN); Junyi Wang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 276 days.

(21) Appl. No.: 16/962,937

(22) PCT Filed: Jan. 24, 2018

(86) PCT No.: PCT/CN2018/074024
§ 371 (c)(1),
(2) Date: Jul. 17, 2020

(87) PCT Pub. No.: WO2019/144321
PCT Pub. Date: Aug. 1, 2019

(65) Prior Publication Data
US 2021/0385286 A1 Dec. 9, 2021

(51) Int. Cl.
*H04L 67/51* (2022.01)
*H04L 61/4541* (2022.01)
(52) U.S. Cl.
CPC .......... *H04L 67/51* (2022.05); *H04L 61/4541* (2022.05)

(58) Field of Classification Search
CPC .... H04L 67/16; H04L 61/1541; H04L 61/151
See application file for complete search history.

(56) References Cited

U.S. PATENT DOCUMENTS 7,552,109 B2  6/2009  Balasubramanian et al.
8,280,946 B1  10/2012  Badros
11,108,702 B1 *  8/2021  Twitchell ............ G06F 9/45558
(Continued)

FOREIGN PATENT DOCUMENTS

CN   103995825 A   8/2014
CN   104537105 A   4/2015

OTHER PUBLICATIONS

Extended European Search Report mailed Jul. 26, 2021 for European Patent Application No. 18902249.4, 8 pages.
(Continued)

*Primary Examiner* — Nicholas R Taylor
*Assistant Examiner* — Tania M Pena-Santana
(74) *Attorney, Agent, or Firm* — Sage Patent Group

(57) ABSTRACT

Various embodiments of the present disclosure provide a method for improving service discovery. The method comprises determining identification information of a service instance by a network node according to a profile of the service instance registered at the network node. The network node can resolve address information of the service instance based at least in part on the identification information. The method further comprises storing the address information in the profile of the service instance. According to the embodiments of the present disclosure, the maintenance of a NF profile can be improved and the service discovery and the resource configuration in a network may be optimized.

18 Claims, 6 Drawing Sheets

(56) References Cited

U.S. PATENT DOCUMENTS

| | | | | |
|---|---|---|---|---|
| 2002/0036658 | A1* | 3/2002 | Carolan | H04L 61/5084 715/764 |
| 2010/0192212 | A1* | 7/2010 | Raleigh | H04M 15/88 726/7 |
| 2010/0228824 | A1 | 9/2010 | Lin et al. | |
| 2012/0271809 | A1 | 10/2012 | Lyon | |
| 2015/0020195 | A1* | 1/2015 | Alizadeh-Shabdiz | H04L 61/5046 726/22 |
| 2017/0303259 | A1* | 10/2017 | Lee | H04W 28/16 |
| 2018/0199279 | A1* | 7/2018 | Baek | H04W 28/088 |
| 2018/0199398 | A1* | 7/2018 | Dao | H04W 76/34 |
| 2018/0227871 | A1* | 8/2018 | Singh | H04W 48/18 |
| 2020/0314615 | A1* | 10/2020 | Patil | H04L 41/082 |
| 2021/0195506 | A1* | 6/2021 | Bartolomé Rodrigo | H04W 24/02 |
| 2021/0282078 | A1* | 9/2021 | Martinez De La Cruz | H04L 61/305 |
| 2021/0321245 | A1* | 10/2021 | Landais | H04W 8/06 |
| 2022/0060548 | A1* | 2/2022 | Wang | H04L 67/16 |
| 2023/0072290 | A1* | 3/2023 | Rajput | H04L 63/123 |

OTHER PUBLICATIONS

3GPP, Technical Specification Group Services and System Aspects, System Architecture for the 5G System, Stage 2 (Release 15), 3GPP TS 23.501, V15.0.0, Dec. 2017, 181 pages.

3GPP, Technical Specification Group Core Network and Terminals, 5G System—Phase 1, CT WG4 Aspects (Release 15), 3GPP TR 29.891, V15.0.0, Dec. 2017, 146 pages.

Cheshire, S. et al., "DNS-Based Service Discovery", Internet Engineering Task Force (IETF), Standard Track, Internet Society (ISOC) 4, RFC 6763, Feb. 2013, Geneva, Switzerland, 49 pages.

PCT International Search Report and Written Opinion mailed Oct. 10, 2018 for International Application No. PCT/CN2018/074024, 8 pages.

Yanling, Yao; "The Information Retrieval Tool for WWW Network Resource—Search Engine"; Journal of Modern Information, No. 09, ISSN 1008-0821; Sep. 30, 2003; pp. 106-107; 2 pages.

3GPP; Technical Specification Group Services and System Aspects; System Architecture for the 5G System; Stage 2 (Release 15); 3GPP TS 23.501 V1.5.0 (Nov. 2017); Nov. 2017; Valbonne, France; 170 pages.

3GPP; Technical Specification Group Services and System Aspects; Procedures for the 5G System; Stage 2 (Release 15); 3GPP TS 23.502 V1.3.0 (Nov. 2017); Nov. 2017; Valbonne, France; 215 pages.

European Communication Art. 94(3) For EP Application No. 18902249.4 mailed Feb. 2, 2023, 4 pages.

Briscoe, Bob et al., "Reducing Internet Latency: A Survey of Techniques and Their Merits," IEEE Communications Surveys & Tutorials IEEE, USA, vol. 18, No. 3, 48 pages.

Summons to Attend Oral Proceedings Pursuant to Rule 115(1) EPC mailed Jun. 27, 2024 for European Patent Application No. 18902249.4, 7 pages.

\* cited by examiner

METHOD AND APPARATUS FOR IMPROVING SERVICE DISCOVERY

CROSS-REFERENCE TO RELATED APPLICATIONS

This application is a 35 U.S.C § 371 national stage application for International Application No. PCT/CN2018/074024, entitled "METHOD AND APPARATUS FOR IMPROVING SERVICE DISCOVERY", filed on Jan. 24, 2018, the disclosures and contents of which are hereby incorporated by reference in their entireties.

FIELD OF THE INVENTION

The present disclosure generally relates to communication networks, and more specifically, to methods and apparatus for improving service discovery in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. To meet the diverse requirements of new services across a wide variety of industries, the 3rd generation partnership project (3GPP) is developing a core network architecture for the next generation network such as a new radio (NR)/fifth generation (5G) network. The 5G core network may be supposed to support the wide range of performance requirements demanded by new business opportunities, multiple access technologies, a variety of services and new device types. The service-based architecture (SBA) under development for the next generation network can restructure the core network control plane and divide it into multiple independent modules with decoupled functions that can be updated individually. The introduction of the service-based interface protocols and network-function repository function (NRF) may enable the function modules to be used flexibly. In the SBA, service discovery may be provided for individual network functions (NFs) by a NRF, so as to meet different service requirements. Thus, it is desirable to improve service discovery in a communication network.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The ongoing 3GPP activity aims to reform the core network architecture for the next generation network, including introduction of SBA for better cloud adoption. The SBA can provide service-based functions, interfaces and operations for the core network control plane and enable the next generation network such as NR or 5G to address service requirements of various applications. The NF service discovery in the network may be implemented by using the NRF which can maintain NF profiles for NF instances and their supported services. A NF service consumer can discover a service by querying the NRF. Correspondingly, the NRF can provide a list of service instance candidates to the NF service consumer. However, some service instance candidates may not be optimal as their physical availability may not be known and considered by the NRF. Therefore, there may be a need for the NRF to improve the maintenance of NF profiles in a more efficient way, so as to improve the performance of service discovery.

The present disclosure proposes a solution of improving service discovery, which can enable a network node (such as a NRF or any other network entity configured with a service repository function) to resolve address information (such as one or more Internet protocol (IP) addresses and/or non-IP addresses) of a NF/service instance registered at the network node and expand a profile of the NF/service instance maintained by the NRF, so as to optimize service discovery and improve resource efficiency.

According to a first aspect of the present disclosure, there is provided a method implemented at a network node such as a NRF or any other network entity configured with a service repository function. The method comprises determining identification information of a service instance according to a profile of the service instance registered at the network node. The network node can resolve address information of the service instance based at least in part on the identification information of the service instance. The method further comprises storing the address information in the profile of the service instance.

In accordance with an exemplary embodiment, the determination of the identification information of the service instance according to the profile of the service instance may comprise retrieving the identification information of the service instance from the profile of the service instance. Alternatively, the determination of the identification information of the service instance according to the profile of the service instance may comprise constructing the identification information of the service instance based at least in part on the profile of the service instance.

In accordance with an exemplary embodiment, the determination of the identification information of the service instance may be triggered by at least one of the following requests: a registration request of the service instance from a service provider; and a discovery request from a service consumer for a service which may be provided at least by the service instance.

In accordance with an exemplary embodiment, the method according to the first aspect of the present disclosure may further comprise checking reachability of the service instance based at least in part on the address information of the service instance.

In accordance with an exemplary embodiment, the method according to the first aspect of the present disclosure may further comprise updating the address information of the service instance by periodical resolution of the address information of the service instance.

In accordance with an exemplary embodiment, the method according to the first aspect of the present disclosure may further comprise adjusting a priority of the service instance based at least in part on the address information of the service instance.

In accordance with an exemplary embodiment, the method according to the first aspect of the present disclosure may further comprise receiving a discovery request of a service from a service consumer. In this embodiment, the service instance registered at the network node as mentioned previously is able to provide the service requested by the service consumer. The method according to the first aspect of the present disclosure may further comprise generating a discovery result based at least in part on the discovery request. The discovery result may comprise at least the address information of the service instance. Optionally, the discovery result may further comprise the identification information of the service instance.

In accordance with an exemplary embodiment, the discovery result may further comprise address information of one or more other service instances which are registered at the network node and able to provide the service. Optionally, the discovery result may further comprise identification information of the one or more other service instances.

In accordance with an exemplary embodiment, the method according to the first aspect of the present disclosure may further comprise sorting the service instance and the one or more other service instances in the discovery result according to the respective priorities thereof.

In accordance with an exemplary embodiment, the method according to the first aspect of the present disclosure may further comprise removing at least one service instance from the discovery result based at least in part on a predefined configuration.

In accordance with an exemplary embodiment, the method according to the first aspect of the present disclosure may further comprise transmitting the discovery result to the service consumer.

According to a second aspect of the present disclosure, there is provided an apparatus implemented in a network node such as a NRF or any other network entity configured with a service repository function. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus implemented in a network node such as a NRF or any other network entity configured with a service repository function. The apparatus comprises a determining unit, a resolving unit and a storing unit. In accordance with some exemplary embodiments, the determining unit is operable to carry out at least the determining step of the method according to the first aspect of the present disclosure. The resolving unit is operable to carry out at least the resolving step of the method according to the first aspect of the present disclosure. The storing unit is operable to carry out at least the storing step of the method according to the first aspect of the present disclosure.

According to a fifth aspect of the present disclosure, there is provided a method implemented at a service consumer such as a NF instance or a service instance. The method comprises transmitting a discovery request of a service to a network node. The method further comprises receiving a discovery result based at least in part on the discovery request from the network node. The discovery result comprises at least address information of a service instance which is registered at the network node and able to provide the service.

In accordance with an exemplary embodiment, the address information of the service instance may be resolved by the network node based at least in part on identification information of the service instance. Optionally, the discovery result may further comprise the identification information of the service instance.

In accordance with an exemplary embodiment, the discovery result may further comprise address information of one or more other service instances which are registered at the network node and able to provide the service. Optionally, the discovery result may further comprise identification information of the one or more other service instances.

In accordance with an exemplary embodiment, the service instance and the one or more other service instances in the discovery result may be sorted according to the respective priorities thereof. Optionally, the respective priorities may be based at least in part on the corresponding address information of the service instance and the one or more other service instances.

According to a sixth aspect of the present disclosure, there is provided an apparatus implemented in a service consumer. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus implemented in a service consumer. The apparatus comprises a transmitting unit and a receiving unit. In accordance with some exemplary embodiments, the transmitting unit is operable to carry out at least the transmitting step of the method according to the fifth aspect of the present disclosure. The receiving unit is operable to carry out at least the receiving step of the method according to the fifth aspect of the present disclosure.

In accordance with an exemplary embodiment, the identification information may comprise at least one of a full qualified domain name (FQDN), a uniform resource identifier (URI) and a uniform resource locator (URL).

In accordance with an exemplary embodiment, the address information may comprise one or more physical addresses. It will be appreciated that the address information may comprise one or more IP and/or non-IP addresses.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 1:
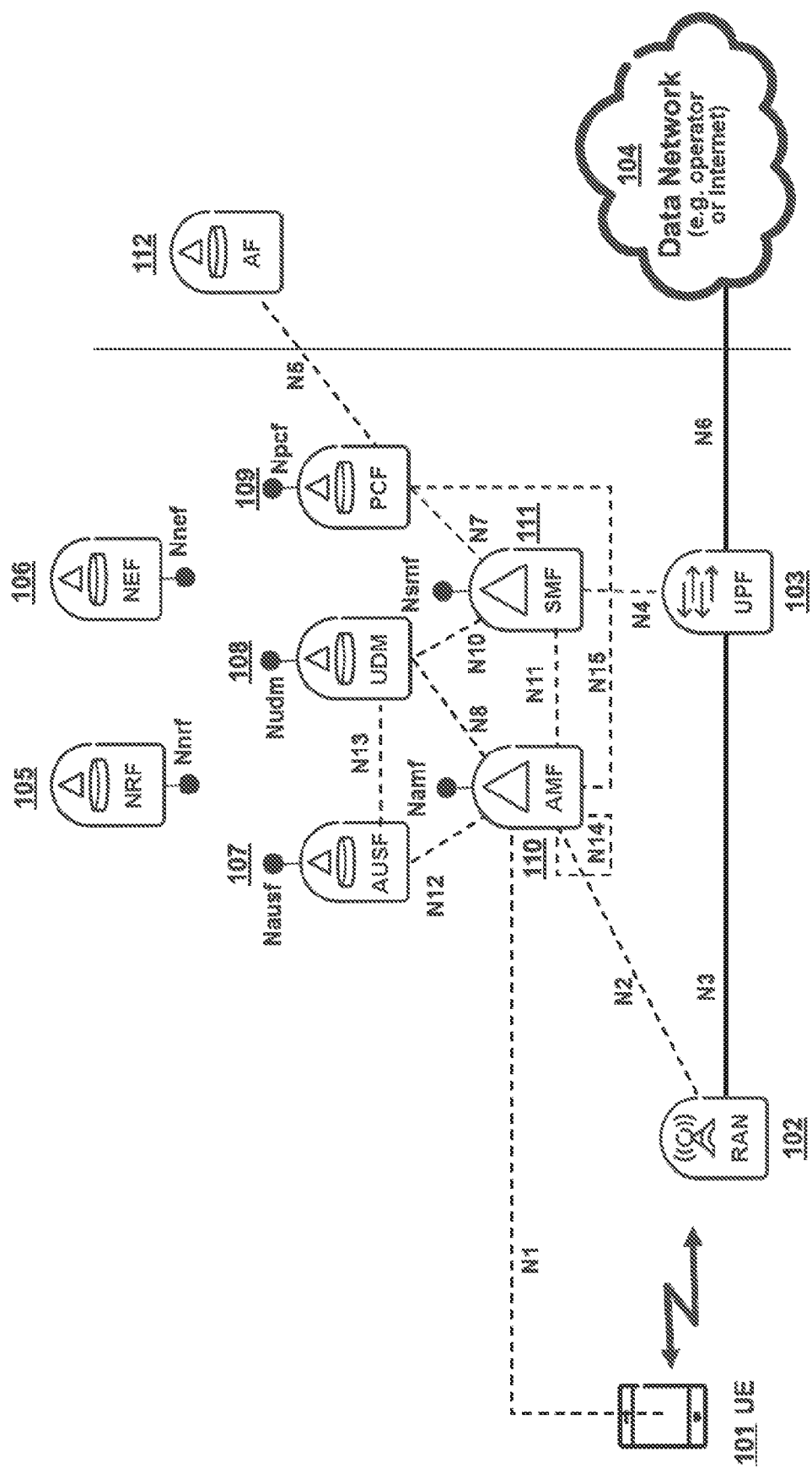
FIG. 1 is a diagram illustrating an exemplary system architecture according to an embodiment of the present disclosure.

FIG. 1 is a diagram illustrating an exemplary system architecture according to an embodiment of the present disclosure. Although the subject matter described herein may be implemented in any appropriate type of system using any suitable components, the embodiments disclosed herein are described in relation to a wireless communication system complied with the exemplary system architecture illustrated in FIG. 1. The diagram in FIG. 1 may represent the high level architecture such as SBA in the next generation network. For simplicity, the system architecture of FIG. 1 only depicts some exemplary elements such as a user equipment (UE) 101, a radio access network (RAN) 102, a user plane function (UPF) 103, a data network 104, a NRF 105, a network exposure function (NEF) 106, an authentication server function (AUSF) 107, a unified data management (UDM) 108, a policy control function (PCF) 109, an access and mobility management function (AMF) 110, a session management function (SMF) 111, and an application function (AF) 112. In practice, a wireless communication system may further include any additional elements suitable to support communication between wireless devices or between a wireless device and another communication device, such as a landline telephone, a service provider, or any other network node or terminal device. By way of example and not limitation, the terminal device may refer to a mobile terminal, a UE, or other suitable devices. The wireless communication system may provide communication and various types of services to one or more wireless devices to facilitate the wireless devices' access to and/or use of the services provided by, or via, the wireless communication system.

In accordance with an exemplary embodiment, the UE 101 may be, for example, a mobile station (MS), an access terminal (AT), a subscriber station, or any other suitable terminal device. The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As another specific example, in an IoT scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3GPP context be referred to as a machine-type communication (MTC) device.

In accordance with an exemplary embodiment, the UE 101 can establish a signaling connection with the AMF 110 over the reference point N1, as illustrated in FIG. 1. This signaling connection may enable non-access stratum (NAS) signaling exchange between the UE 101 and the core network, comprising a signaling connection between the UE 101 and the RAN 102 and the N2 connection for this UE 101 between the RAN 102 and the AMF 110. The RAN 102 can communicate with the UPF 103 over the reference point N3. The UE 101 can establish a packet data unit (PDU) session to the data network 104 (e.g. an operator network or Internet) through the UPF 103 over the reference point N6.

As further illustrated in FIG. 1, the exemplary system architecture also contains the service-based interfaces such as Nnrf, Nnef, Nausf, Nudm, Npcf, Namf and Nsmf exhibited by NFs such as the NRF 105, the NEF 106, the AUSF 107, the UDM 108, the PCF 109, the AMF 110 and the SMF 111. In addition, FIG. 1 also shows some reference points such as N4, N5, N7, N8, N10, N11, N12, N13, N14 and N15, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1 may be responsible for functions such as session management, mobility management, authentication, and security. These are critical for delivering a service in the network. For example, the NEF 106 may act as a gateway which can enable external users to monitor, provision and enforce an application policy for users inside the network. The AUSF 107 may be configured as an authentication server. The UDM 108 can store subscriber data and profiles. The PCF 109 can provide a policy framework incorporating network slicing, roaming and mobility management. The AMF 110 can manage access control and mobility. The SMF 111 can set up and manage sessions according to a network policy. The UPF 103 can be deployed in various configurations and locations according to the service type.

The NRF 105 is a new network entity which can provide registration and discovery functionality so that the NFs can discover each other and implement communications via application programming interfaces (APIs). For example, the "service registration" functionality of the NRF can facilitate the negotiation of how and where a service can be utilized by its consumer such as a NF instance or a service instance. It will be appreciated that a NF instance also may be regarded as a special example of a service instance, and thus the terms "NF instance" and "service instance" may be used interchangeably in some cases.

In accordance with some exemplary embodiments, the NRF can support NF/service discovery functionality. For example, the NRF may receive a NF/service discovery request from a requester NF instance, and provide the information of the discovered NF instance(s) to the requester NF instance. The requester NF instance can implement NF selection. The NF selection may consist in selecting a NF instance among the NF instance(s) discovered through the NF/service discovery. As an example, the SMF selection may be supported by the AMF.

The NRF can maintain NF profiles of available NF instances and their supported services. For example, each NF instance can inform the NRF of a NF profile of this NF instance. The NF profile may comprise a list of services supported by the NF instance, and other NF instance information. The typical information of a NF profile may include but not limit to NF instance identifier (ID), NF type (e.g. SMF), public land mobile network (PLMN) ID, NF protocol information and identification/address information (e.g. URI, URL, FQDN or IP address), NF capacity information, NF specific service authorization information, names of supported services, endpoint information of instance(s) of each supported service, the supported data network names (DNNs) or access point names (APNs), NF location, load information at the NF and NF service level, other service parameter, etc.

It can be seen that the static and dynamic information for a NF instance may be stored in a NF profile at the NRF. According to the NF profiles stored at the NRF, one or more NF instances may be discovered during a NF/service discovery procedure performed for a requester NF instance.

The NRF may provide information related to the discovered NF instances to the requester NF instance, so that the requester NF instance can access the requested NF/service by using the protocol and identification/address information (e.g. URI, URL, FQDN or IP address) of the NF instance which can provide the requested NF/service. It may be realized that a NF service supported by a NF instance may be accessible via the corresponding protocols and identification/address information. Different services of the same NF instance may be accessible via different identification/address information.

Figure 2:
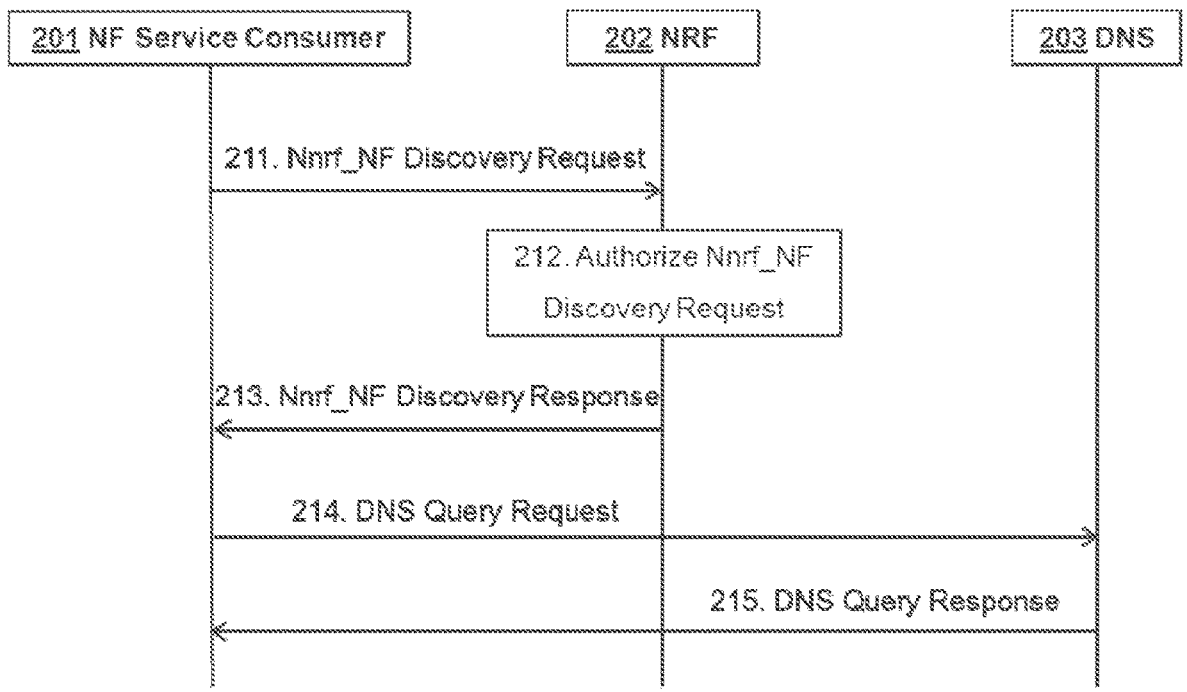
FIG. 2 is a diagram illustrating an exemplary service discovery procedure according to an embodiment of the present disclosure.

FIG. 2 is a diagram illustrating an exemplary service discovery procedure according to an embodiment of the present disclosure. For simplicity, FIG. 2 only depicts some exemplary network elements such as a NF service consumer 201, a NRF 202 and a domain name system (DNS) 203. It will be appreciated that signaling messages and network elements shown in FIG. 2 are just as examples, and more or less alternative signaling messages and network elements may be involved in the service discovery procedure.

In order to use a service provided by a NF service provider (not shown in FIG. 2), the NF service consumer 201 (such as the AMF 110 shown in FIG. 1) may discover the service by querying the NRF 202. According to the exemplary service discovery procedure illustrated in FIG. 2, the NF service consumer 201 may send 211 a Nnrf_NF discovery request to the NRF 202. Then the NRF 202 may authorize 212 the Nnrf_NF discovery request. For example, based on a profile of the expected NF or NF service and the type of the NF service consumer 201, the NRF 202 can determine whether the NF service consumer 201 is allowed to discover the expected NF instance(s). If allowed, the NRF 202 can discover proper NF instance(s) or service instance (s) and provide 213 a Nnrf_NF discovery response to the NF service consumer 201. The Nnrf_NF discovery response may comprise some information of the discovered NF instance(s) or service instance(s), such as FQDN, IP address, or end point addresses (e.g., URLs or URIs). Based on the information in the discovery response, the NF service consumer 201 can select a specific NF/service instance which is able to provide the requested service.

When a service instance is select, for example, an instance of the PCF 109 which can provide policy authorization, the NF service consumer 201 may intend to use that service instance. If a FQDN/URL/URI alike record instead of an actual IP address of the service instance is provided by the NRF 202, then the NF service consumer 201 may have to query the DNS 203 to get the actual IP address of that service instance. As illustrated in FIG. 2, the NF service consumer 201 may send 214 a DNS query request to the DNS 203. Then the DNS 203 may return 215 the physical address (such as an actual IP address) of the service instance to the NF service consumer 201 via a DNS query response.

In the respect of locating addresses, compared with the DNS 203, the NRF 202 may provide a much wider scope because a NF profile maintained by the NRF may be useful for discovery of NF capability, NF authorization control, extendibility control, capability matching, supporting application level load balance, etc. On the other hand, the ability of providing such information as FQDN, URI, URL and IP address by the NRF 202 may make it a little vague how the data consistency can be achieved between different network entities such as the NRF 202 and the DNS 203.

In the service discovery procedure of FIG. 2, although the NF service consumer 201 can get the actual IP address of the service instance which can provide the requested service, for example, by querying the DNS 203, it may lead to a situation where the NF/service instance(s) discovered for the NF service consumer 201 by the NRF 202 may not be optimal. For example, the NRF 202 may select a NF/service instance according to the capability check result of the NF/service instance, while the physical availability or the working status of the NF/service instance may not be known and considered by the NRF 202 in the service discovery procedure.

In accordance with some exemplary embodiments, the present disclosure provides a solution to enable a network node (such as a NRF or any other network entity configured with a service repository function) to resolve a physical address of a NF/service instance, for example, locally or by querying a DNS or other suitable address resolution system, so as to augment a NF profile maintained for the NF/service instance by the network node. As such, the network node can return a discovery result, which may be optimized according to the physical availability of the NF/service instance, to a service consumer which intends to discover a service provided by the service instance.

By querying the DNS for address resolution, the network node can obtain address information of a NF/service instance while keeping the address information in consistence with the DNS. The proposed solution also can enable the network node to adjust a priority of the NF/service instance based at least in part on the physical address of the NF/service instance. Optionally, the network node can schedule some NF/service instance candidates for selection by the service consumer, according to the respective priorities of the NF/service instance candidates, besides other NR/service discovery criteria.

Figure 3:
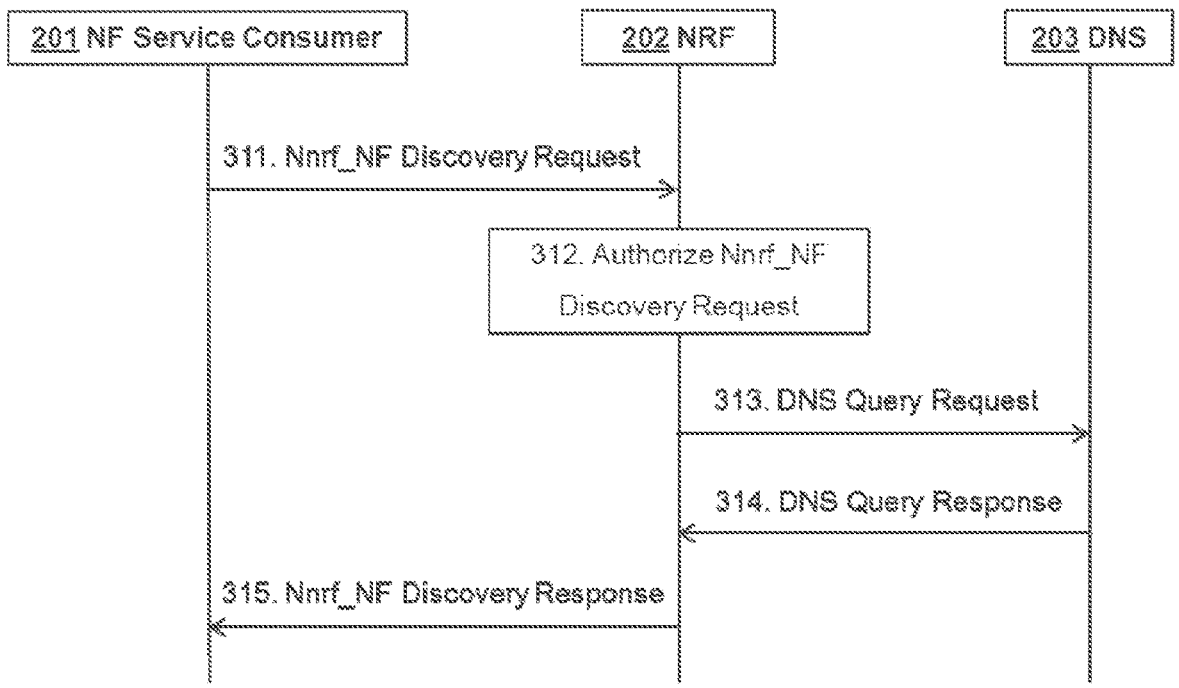
FIG. 3 is a diagram illustrating an exemplary service discovery procedure according to some embodiments of the present disclosure.

FIG. 3 is a diagram illustrating an exemplary service discovery procedure according to some embodiments of the present disclosure. Similar to FIG. 2, some exemplary network elements such as the NF service consumer 201, the NRF 202 and the DNS 203 are shown in FIG. 3. It will be appreciated that signaling messages and network elements shown in FIG. 3 are just as examples, and more or less alternative signaling messages and network elements may be involved in the service discovery procedure.

As illustrated in FIG. 3, the NF service consumer 201 may intend to discover one or more services available in the network and invoke a service query to the NRF 202, for example, by sending 311 a Nnrf_NF discovery request to the NRF 202. In the case that the NRF 202 authorizes 312 the Nnrf_NF discovery request, the NRF 202 can discover proper NF instance(s) or service instance(s) which can provide the requested service. For example, the NRF 202 can determine a discovery result based at least in part on NF/service profiles stored at the NRF 202.

If the NRF 202 finds that a NF/service profile of a discovered NF/service instance merely contains a FQDN instead of an IP address of the NF/service instance, the NRF 202 can resolve this FQDN by means of the DNS 203. As illustrated in FIG. 3, the NRF 202 may send 313 a DNS query request for the NF/service instance to the DNS 203, and receive 314 a DNS query response from the DNS 203. The DNS query response may comprise the resolved IP address of the NF/service instance. Then the NRF 202 can return 315 a Nnrf_NF discovery response to the NF service consumer 201. The discovery response may comprise the IP address and optionally the FQDN of the NF/service instance. Based at least in part on the discovery response, the NF service consumer 201 can select a specific NF instance or service instance which can provide the requested service.

Figure 4:
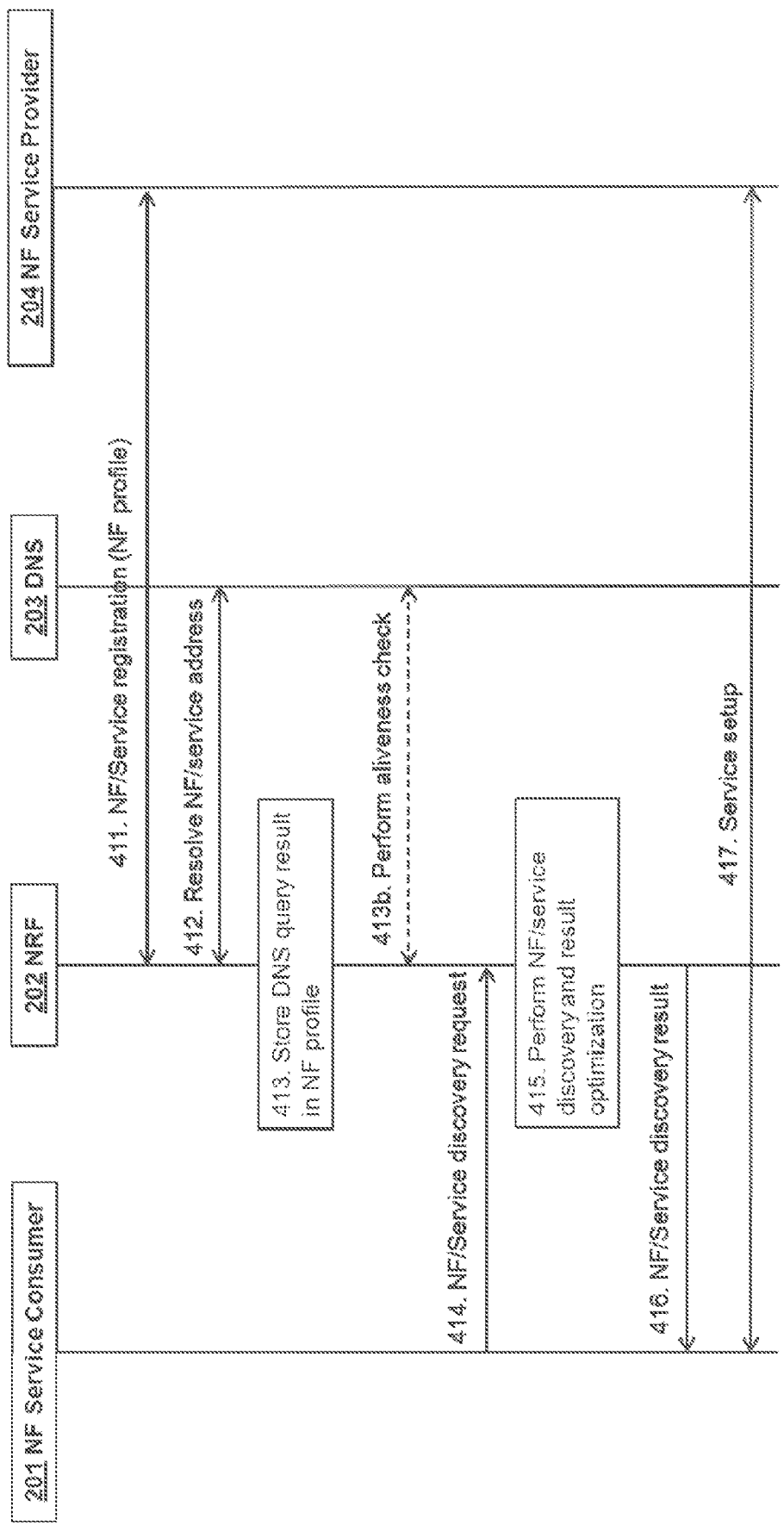
FIG. 4 is a diagram illustrating another exemplary service discovery procedure according to some embodiments of the present disclosure.

FIG. 4 is a diagram illustrating another exemplary service discovery procedure according to some embodiments of the present disclosure. In the exemplary service discovery procedure illustrated in FIG. 4, the NRF 202 may perform a DNS query prior to receipt of a service discovery request from the NF service consumer 201. In addition to the exemplary network elements such as the NF service consumer 201, the NRF 202 and the DNS 203, FIG. 4 also shows a NF service provider 204. It will be appreciated that signaling messages and network elements shown in FIG. 4 are just as examples, and more or less alternative signaling messages and network elements may be involved in the service discovery procedure.

As illustrated in FIG. 4, the NF service provider 204 may perform 411 a NF/service registration towards the NRF 202. In accordance with an exemplary embodiment, the NF service provider 204 such as the UDM 108 may send a NF registration request message to the NRF 202 to inform the NRF 202 of a NF profile of a NF/service instance pertaining to the NF service provider 204. For example, the NF profile may include NF type, a FQDN or IP address of a NF, names of supported services, endpoint information of instance(s) of each supported service, and other service parameters. The NRF 202 may store the NF profile and mark the corresponding NF/service instance available. Then the NRF 202 may acknowledge that the NF/service registration is accepted via a NF registration response message to the NF service provider 204.

In accordance with an exemplary embodiment, the NRF 202 may check whether an actual IP address of the NF/service instance can be found in the NF profile of the NF/service instance. If the NF profile merely indicates identification information or naming information such as URL, URI or FQDN of the NF/service instance, the NRF 202 may resolve 412 address information of the NF/service instance from the DNS 203. It can be realized that the NRF 202 also may resolve the address information of the NF/service instance locally, although it is not shown in FIG. 4.

Optionally, the NRF 202 may construct identification information or naming information for a NF/service instance according to a mobile network operator (MNO) configuration or policy. In accordance with an exemplary embodiment where no identification/naming information of a NF/service instance is provided by the NF service provider 204 during the registration of the NF/service instance, and/or the registered identification/naming information at the NRF 202 is not complete or resolvable, the NRF 202 can construct the identification/naming information for the NF/service instance, based at least in part on the NF/service instance's profile and other configuration information, for example, host ID, PLMN information, slice information, protocol information, network topology information, location information, service capability information such as APN and DNN, etc. The constructed identification/naming information for the NF/service instance may be used by the NRF 202 as an input of a DNS query for the NF/service instance.

As further illustrated in FIG. 4, the NRF 202 may store 413 a DNS resolution result comprising the address information of the NF/service instance in the NF profile of the NF/service instance. In accordance with an exemplary embodiment, the NRF 202 may adjust a priority of the NF/service instance based at least in part on the address information of the NF/service instance. For example, the NRF 202 may decrease a priority of a NF/service instance in the case that an IP address cannot be resolved for the NF/service instance. Alternatively or additionally, a priority of a NF/service instance which is unreachable according to an IP address of the NF/service instance also may be decreased by the NRF 202.

Optionally, the NRF 202 may perform 413*b* a periodical aliveness check on address information of at least a part of NF/service instances registered at the NRF 202. In accordance with an exemplary embodiment, the NRF 202 may query the resolved address information from the DNS 203 periodically, for all or a part of the registered NF/service instances. As such, the NRF 202 can get the up-to-date address information for the registered NF/service instances. This is especially beneficial for a NF/service instance of which the address information cannot be resolved previously, and/or a NF/service instance which is unreachable according to its old address information. Alternatively or additionally, the NRF 202 may locally check whether the address information of a NF/service instance is kept alive or healthy for service access, for example, by sending a ping request to the NF/service instance with the corresponding address information.

According to the exemplary service discovery procedure illustrated in FIG. 4, the NF service consumer 201 may invoke the NF/service discovery by sending 414 a NF/service discovery request towards the NRF 202. The NRF 202 may perform 415 the NF/service discovery and result optimization based at least in part on the NF profiles within its repository, in response to the discovery request from the NF service consumer 201. In accordance with an exemplary embodiment, besides the NF/service capability check according to the discovery request, the NRF 202 may consider priorities of the discovered NF/service instances. For example, the NRF 202 may list the discovered NF/service instances according to their respective priorities, and select at least a part of the listed NF/service instances as a discovery result. Optionally, according to a local configuration or MNO policy, the NRF 202 may further optimize the discovery result by removing some NF/service instances from the discovery result, for example, if the address information of these NF/service instances is null or with relative lower priorities.

The optimization of the discovery result by the NRF 202 can improve NF/service instance selection efficiency and save radio resources, from the perspective of the NF service consumer 201, because the NF/service instance with higher priority recommended by the NRF 202 may have better service capability and physical availability.

As an example, there are three UDM instances (which may be denoted as UDM-1, UDM-2, UDM-3) registered in the NRF 202. When the NF service consumer 201 such as an AMF intends to discover "UDM" in the NRF 202, the respective records of these UDM instances may be returned to the NF service consumer 201. The NRF 202 may sort the records of the UDM instances according to a local configuration, for example, random order, time flag, round robin, etc. Optionally, the records of the UDM instances may be sorted based on the corresponding attributes such as NF load status and/or capacity status from the NF profiles. In accordance with an exemplary embodiment where the NF load is defined as a sorting criterion, the NRF 202 may provide the NF service consumer 201 with a discovery result in which the UDM instances are sorted as UDM-1 (load 30%), UDM-2 (load 50%) and UDM-3 (load 80%). It is noted that an important factor of whether a NF/service instance is reachable or healthy from the routing perspective is not taken into account in this discovery result.

In accordance with an exemplary embodiment where the NRF 202 can additionally resolve physical addresses of the three UDM instances, IP addresses of the UDM instances may be obtained by the NRF 202 from the DNS 203, which may be denoted as UDM-1 (IP1, IP2, IP3), UDM-2 (IP4, IP5) and UDM-3 (IP6). If no IP address can be resolved from the DNS 203 for a certain UDM instance or a health check on an IP address of a UDM instance shows that the usability of the IP address is low (e.g. long ping response time), then the NRF 202 may adjust the priority of this UDM instance. For example, if UDM-1's IP address is un-resolvable or unreachable (IP1/IP2/IP3 being unreachable), the NRF 202 may decrease the priority of UDM-1. Accordingly, the UDM instances in the discovery result may be sorted as UDM-2 (load 50%, IP4/IP5), UDM-3 (load 80%, IP6) and UDM-1 (load 30%, IP1/IP2/IP3). It can be seen that both of the NF load and the physical availability of the NF/service instance are considered in the sorting criterion for the discovery result.

In accordance with an exemplary embodiment, the NRF 202 may return 416 the optimized NF/service discovery result back to the NF service consumer 201. Based on the discovery result from the NRF 202, the NRF service consumer 201 can select one or more appropriate NF/service instances which can provide the requested service. In the case that the NF service provider 204 is selected, the NRF service consumer 201 may perform 417 service setup with the NF service provider 204 to obtain the requested service.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

Figure 5:
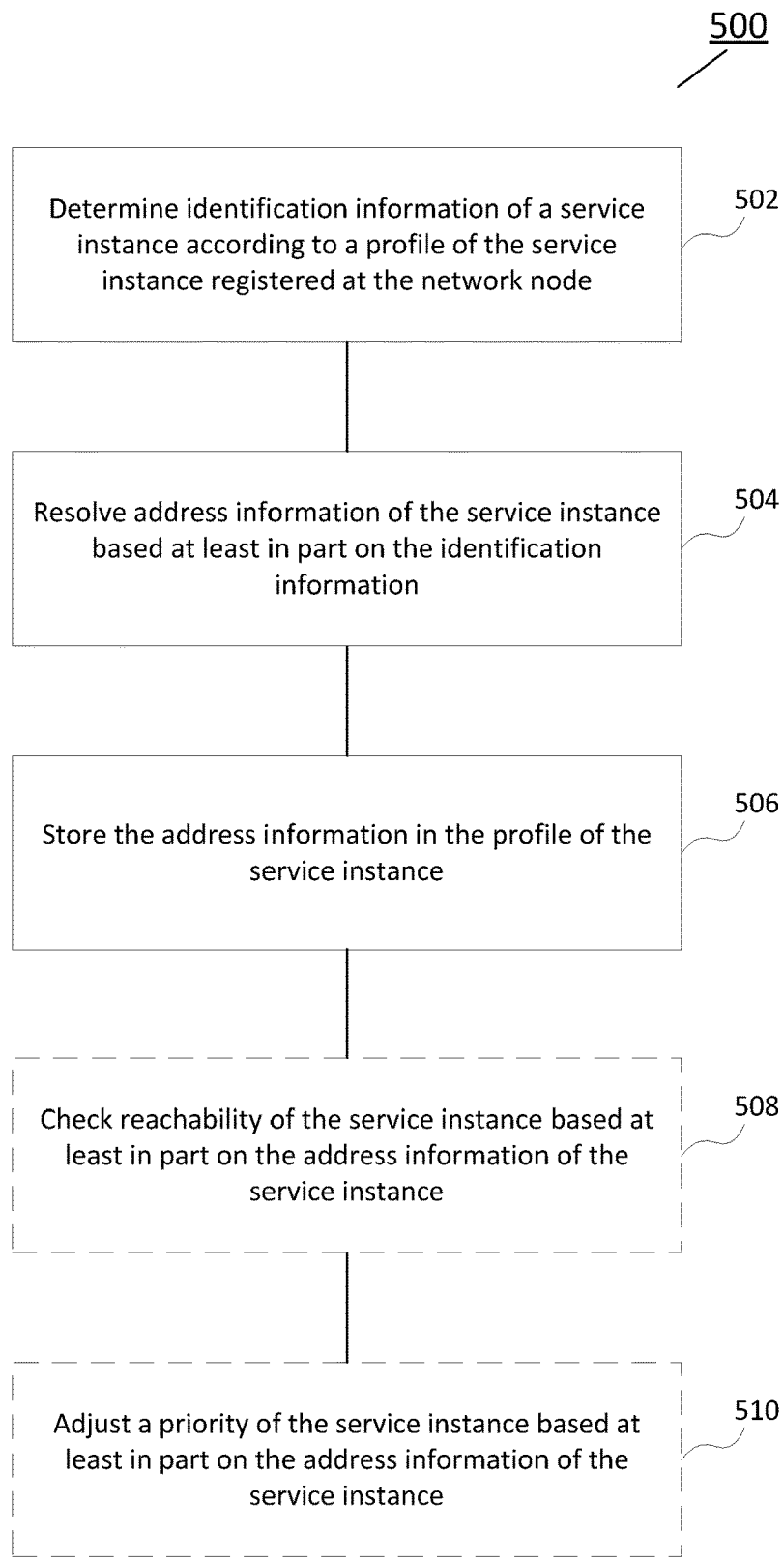
FIG. 5 is a flowchart illustrating a method according to some embodiments of the present disclosure.

FIG. 5 is a flowchart illustrating a method 500 according to some embodiments of the present disclosure. The method 500 illustrated in FIG. 5 may be performed by an apparatus implemented in a network node or communicatively coupled to a network node. In accordance with an exemplary embodiment, the network node (such as a NRF or any other network entity configured with a service repository function) may maintain the respective profiles of one or more NF/service instances, and can support service discovery based at least in part on these profiles. It is noted that the term "NF/service instance" is also referred to as "service instance" hereafter for ease of illustration.

According to the exemplary method 500 illustrated in FIG. 5, the network node can determine identification information of a service instance according to a profile of the service instance registered at the network node, as shown in block 502. In accordance with an exemplary embodiment, the identification information may comprise at least one of a FQDN, a URI, a URL and any other information which can identify the service instance. The service instance may be registered at the network node in response to a registration request from a service provider such as another service instance.

In accordance with an exemplary embodiment, the determination of the identification information of the service instance according to the profile of the service instance may comprise retrieving the identification information of the service instance from the profile of the service instance. Alternatively or additionally, the determination of the identification information of the service instance according to the profile of the service instance may comprise constructing the identification information of the service instance based at least in part on the profile of the service instance. For example, the network node can directly find the identification information of the service instance from the profile of the service instance. Alternatively or additionally, the network node can use some information in the profile of the service instance and optionally other configuration information, for example, host ID, PLMN information, slice information, protocol information, network topology information, location information, service capability information and/or the like, to construct the identification information of the service instance.

In accordance with an exemplary embodiment, the determination of the identification information of the service instance may be triggered by a registration request of the service instance from a service provider such as another service instance. For example, when requesting registration to the network node, the service provider may provide the identification information of the service instance or any other information applicable to construct the identification information of the service instance to the network node. In this case, the network node can determine the identification information of the service instance according to the relevant information obtained from the service provider.

Alternatively or additionally, the determination of the identification information of the service instance may be triggered by a discovery request from a service consumer for a service provided at least by the service instance described in block 502. In this case, the network node may check the identification information of the service instance in the profile of the service instance, in response to the discovery request from the service consumer. If there is no identification information of the service instance in the profile of the service instance, the network node can construct the identification information for the service instance.

Based at least in part on the identification information, the network node can resolve address information of the service instance, as shown in block 504. For example, the network node may resolve the address information of the service instance locally or by querying a DNS or other suitable network entity capable of address resolution. In accordance with an exemplary embodiment, the address information of the service instance may comprise one or more physical addresses (such as IP addresses) of the service instance. It can be realized that one or more non-IP addresses of the service instance also may be used as the address information of the service instance. According to the exemplary method 500 illustrated in FIG. 5, the network node may store the address information in the profile of the service instance, as shown in block 506.

In accordance with an exemplary embodiment, the network node may check reachability of the service instance based at least in part on the address information of the service instance, as shown in block 508. For example, the network node may send a ping request to the service instance by using the address information of the service instance. In response to receipt of a ping response from the service instance, the network node can determine that the service instance is reachable with the address information. Otherwise, the service instance may be considered as unreachable or unavailable.

In accordance with an exemplary embodiment, the network node may update the address information of the service instance by periodical resolution of the address information of the service instance. As described in connection with FIG. 4, the physical availability or reachability of the service instance may change, and the address information of the service instance sometimes may become invalid. Therefore, the network node may need to check aliveness or health of the address information of the service instance, and refresh the corresponding address information maintained in the profile of the service instance.

Optionally, the network node may adjust a priority of the service instance based at least in part on the address information of the service instance, as shown in block 510. In accordance with an exemplary embodiment, the priority of the service instance may be related to various factors, such as service capability, NF load and location of the service instance. Besides these factors, the availability of address information of the service instance may also affect the priority of the service instance. For example, in the case that the service instance is unreachable with its address information, or no address information can be resolved for the service instance (i.e. the address information is null), the network node may decrease the priority of the service instance.

In accordance with an exemplary embodiment, the network node may receive a discovery request of a service from a service consumer and generate a discovery result based at least in part on the discovery request. For example, the network node may find that the service instance as described in blocks 502 and 504 is able to provide the service. Then, the network node can get the address information of the service instance and include at least the address information of the service instance in the discovery result. Optionally, the discovery result may further comprise the identification information of the service instance.

In the case that one or more other service instances which are registered at the network node also can provide the requested service, the network node can further include address information of the one or more other service instances in the discovery result. The address information of the one or more other service instances may be resolved by the network node according to identification information of the one or more other service instances. Optionally, the discovery result may further comprise the identification information of the one or more other service instances.

In accordance with an exemplary embodiment, the network node may sort the service instance and the one or more other service instances in the discovery result according to their respective priorities. As mentioned previously, the respective priorities of these service instances may be based at least in part on the corresponding address information of the service instances. For example, the better the physical availability of a service instance, the higher the priority of the service instance, and vice versa.

In accordance with an exemplary embodiment, the network node may remove at least one service instance from the discovery result based at least in part on a predefined configuration. A variety of potential factors, such as the availability of address information of a service instance, the reachability of a service instance, the capability of a service instance, etc., may be considered when specifying the predefined configuration. For example, if address information of a service instance is null or cannot be used to access to the service instance, the network node may remove this service instance from the discovery result.

In accordance with an exemplary embodiment, the discovery result may be transmitted from the network node to the service consumer. Based at least in part on the discovery result which may be optimized by the network node, the service consumer can determine a target service instance more quickly and efficiently, and access the requested service by using address information of the target service instance provided by the network node.

Figure 6:
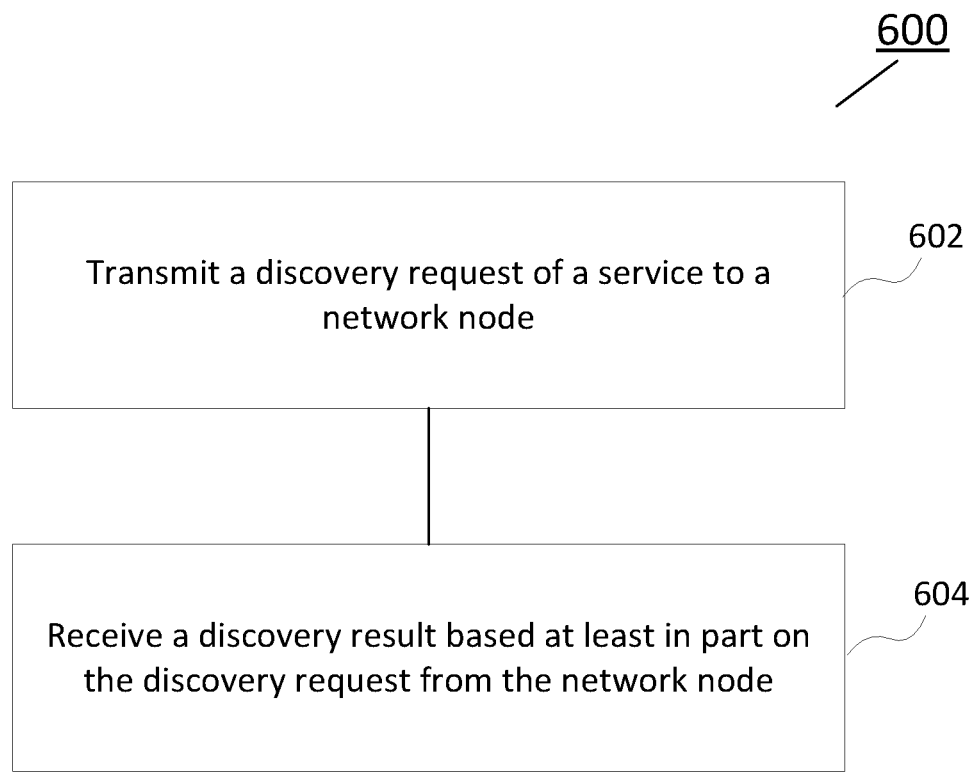
FIG. 6 is a flowchart illustrating another method according to some embodiments of the present disclosure.

FIG. 6 is a flowchart illustrating a method 600 according to some embodiments of the present disclosure. The method 600 illustrated in FIG. 6 may be performed by an apparatus implemented in a service consumer or communicatively coupled to a service consumer. In accordance with an exemplary embodiment, the service consumer such as a NF instance or a service instance may intend to discover a service or a NF/service instance from a network node as described with respect to FIG. 5.

According to the exemplary method 600 illustrated in FIG. 6, the service consumer may transmit a discovery request of a service to a network node, as shown in block 602. The network node may be configured to perform the exemplary method 500 as illustrated in FIG. 5. Correspondingly, the service consumer in the exemplary method 600 may receive a discovery result based at least in part on the discovery request from the network node, as shown in block 604.

In accordance with an exemplary embodiment, the discovery result may comprise at least address information of a service instance which is registered at the network node and able to provide the service. As described in connection with FIG. 5, the address information of the service instance may be resolved by the network node based at least in part on identification information of the service instance. For example, the address information may comprise one or more physical addresses such as IP addresses. Alternatively or additionally, the address information may also comprise one or more non-IP addresses.

In accordance with an exemplary embodiment, the discovery result may further comprise the identification information (for example, a FQDN, a URL, a URI and/or the like) of the service instance. In this case, the service consumer can learn the mapping relationship between the address information and the identification information of the service instance. This may be helpful for the service consumer which wants to quickly identify a service instance and access a service supported by the service instance.

According to an exemplary embodiment where the network node finds that the requested service also may be provided by one or more other service instances registered at the network node, the discovery result may further comprise address information of the one or more other service instances. Optionally, the discovery result may further comprise identification information of the one or more other service instances.

In accordance with an exemplary embodiment, the service instance and the one or more other service instances in the discovery result may be sorted according to the respective priorities thereof. As described with respect to FIG. 5, the respective priorities of the service instance and the one or more other service instances may be based at least in part on the corresponding address information of these service instances.

Based at least in part on the discovery result received from the network node, the service consumer may perform service instance selection to identify a target service instance from which the requested service can be obtained. The optimized sorting of the service instances in the discovery result may contribute to a quick determination of the target service instance and an effective access to the corresponding service by the service consumer.

Many advantages may be achieved by applying the proposed solution according to the present disclosure. For example, the traffic of address resolution may be mostly kept in background (for example, at a NRF, or between a NRF and a DNS) and relieved from the traffic handling NFs. This benefit could be extremely meaningful in the case of scaling service level application in the network, because the amount and dynamics of service instances are much higher than NF instances. On the other hand, the proposed solution can save the effort on many NF service consumers to perform the DNS query individually towards the same NF/service instance, since the address resolution of NF/service instances may be centrally implemented by a NRF. In addition, the whole end-to-end (E2E) procedure latency also can be reduced by using a DNS cache in a NRF.

The various blocks shown in FIG. 5-6 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 7:
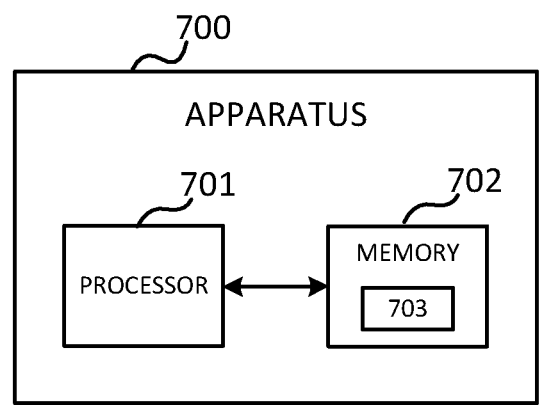
FIG. 7 is a block diagram illustrating an apparatus according to some embodiments of the present disclosure.

FIG. 7 is a block diagram illustrating an apparatus 700 according to various embodiments of the present disclosure. As shown in FIG. 7, the apparatus 700 may comprise one or more processors such as processor 701 and one or more memories such as memory 702 storing computer program codes 703. The memory 702 may be non-transitory machine/processor/computer readable storage medium. In accordance with some exemplary embodiments, the apparatus 700 may be implemented as an integrated circuit chip or module that can be plugged or installed into a network node as described with respect to FIG. 5, or a service consumer as described with respect to FIG. 6.

In some implementations, the one or more memories 702 and the computer program codes 703 may be configured to, with the one or more processors 701, cause the apparatus 700 at least to perform any operation of the method as described in connection with FIG. 5. In other implementations, the one or more memories 702 and the computer program codes 703 may be configured to, with the one or more processors 701, cause the apparatus 700 at least to perform any operation of the method as described in connection with FIG. 6.

Alternatively or additionally, the one or more memories 702 and the computer program codes 703 may be configured to, with the one or more processors 701, cause the apparatus 700 at least to perform more or less operations to implement the proposed methods according to the exemplary embodiments of the present disclosure.

Figure 8:
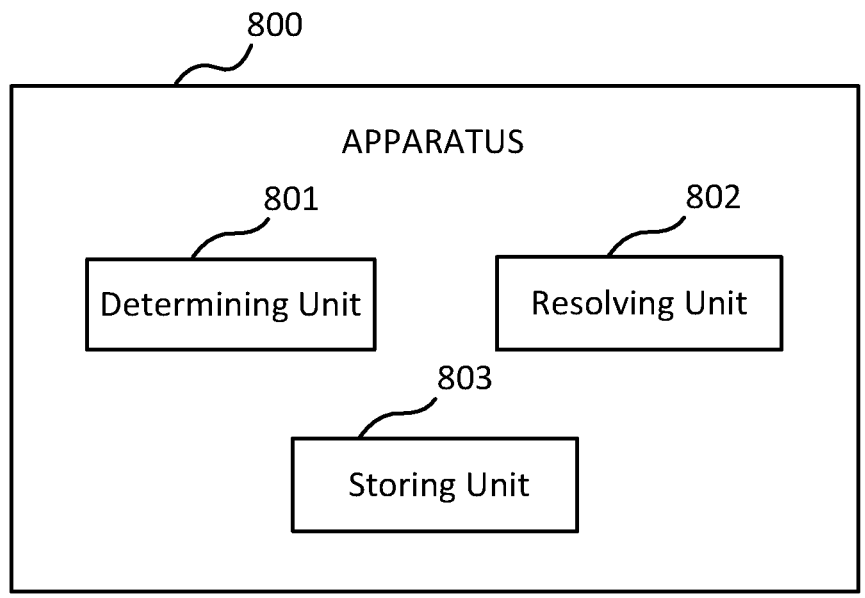
FIG. 8 is a block diagram illustrating an apparatus according to some embodiments of the present disclosure.

FIG. 8 is a block diagram illustrating an apparatus 800 according to some embodiments of the present disclosure. As shown in FIG. 8, the apparatus 800 may comprise a determining unit 801, a resolving unit 802 and a storing unit 803. In an exemplary embodiment, the apparatus 800 may be implemented in a network node such as a NRF or any other network entity configured with a service repository function. The determining unit 801 may be operable to carry out the operation in block 502, the resolving unit 802 may be operable to carry out the operation in block 504, and the storing unit 803 may be operable to carry out the operation in block 506. Optionally, the determining unit 801, the resolving unit 802 and/or the storing unit 803 may be operable to carry out more or less operations to implement the proposed methods according to the exemplary embodiments of the present disclosure.

Figure 9:
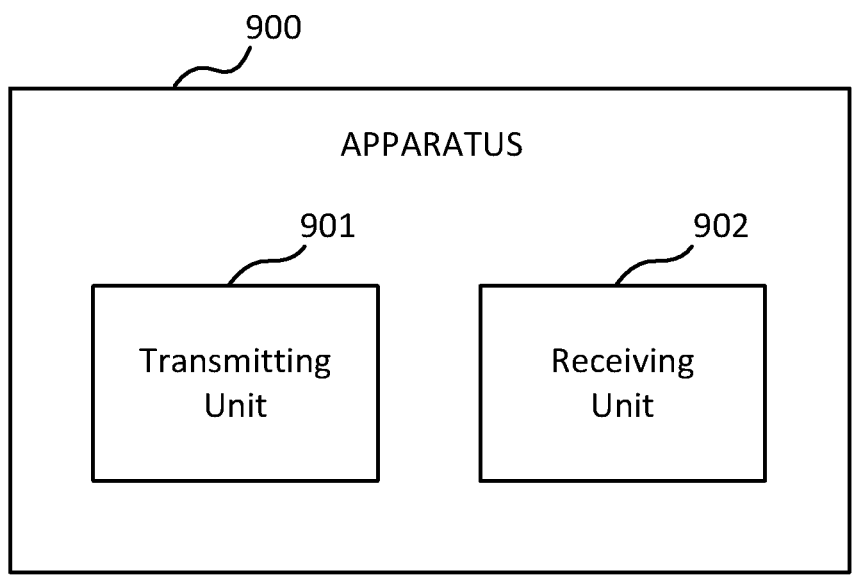
FIG. 9 is a block diagram illustrating an apparatus according to some embodiments of the present disclosure.

FIG. 9 is a block diagram illustrating an apparatus 900 according to some embodiments of the present disclosure. As shown in FIG. 9, the apparatus 900 may comprise a transmitting unit 901 and a receiving unit 902. In an exemplary embodiment, the apparatus 900 may be implemented in a service consumer such as a NF instance or a service instance. The transmitting unit 901 may be operable to carry out the operation in block 602, and the receiving unit 902 may be operable to carry out the operation in block 604. Optionally, the transmitting unit 901 and/or the receiving unit 902 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a network node, the method comprising:
   determining identification information of a service instance according to a profile of the service instance registered at the network node, wherein the identification information is a full qualified domain name (FQDN), and wherein the determination of the identification information of the service instance according to the profile of the service instance comprises constructing the identification information of the service instance based at least in part on the profile of the service instance;
   resolving address information of the service instance based on the identification information being the FQDN;
   storing the resolved address information in the profile of the service instance;
   checking reachability of the service instance based at least in part on the resolved address information of the service instance;
   transmitting the FQDN and the resolved address information of the service instance to a network function (NF) consumer; and
   adjusting a priority of the service instance based at least on a result of the reachability check of the service instance.

2. The method according to claim 1, wherein the address information comprises one or more physical addresses.

3. The method according to claim 1, wherein the determination of the identification information of the service instance according to the profile of the service instance further comprises:
   retrieving the identification information of the service instance from the profile of the service instance.

4. The method according to claim 1, wherein the determination of the identification information of the service instance is triggered by at least one of the following requests:
   a registration request of the service instance from a service provider; and
   a discovery request from a service consumer for a service provided at least by the service instance.

5. The method according to claim 1, further comprising:
   updating the address information of the service instance by periodical resolution of the address information of the service instance.

6. The method according to claim 1, further comprising:
   receiving a discovery request of a service from a service consumer, wherein the service instance is able to provide the service; and
   generating a discovery result based at least in part on the discovery request, wherein the discovery result comprises at least the address information of the service instance, and wherein the discovery result further comprises the identification information of the service instance.

7. The method according to claim 6, wherein the discovery result further comprises: address information of one or more other service instances which are registered at the network node and able to provide the service, and identification information of the one or more other service instances.

8. The method according to claim 7, further comprising:
sorting the service instance and the one or more other service instances in the discovery result according to the respective priorities thereof.

9. The method according to claim 7, further comprising:
removing at least one service instance from the discovery result based at least in part on a predefined configuration; and
transmitting the discovery result to the service consumer.

10. An apparatus implemented in a network node, the apparatus comprising:
one or more processors; and
one or more memories comprising computer program codes, the one or more memories and the computer program codes configured to, with the one or more processors, cause the apparatus at least to:
determine identification information of a service instance according to a profile of the service instance registered at the network node, wherein the identification information is a full qualified domain name (FQDN), and wherein the determination of the identification information of the service instance according to the profile of the service instance comprises constructing the identification information of the service instance based at least in part on the profile of the service instance;
resolve address information of the service instance based on the identification being the FQDN;
store the resolved address information in the profile of the service instance;
check reachability of the service instance based at least in part on the resolved address information of the service instance;
transmit the FQDN and the resolved address information of the service instance to a network function (NF) consumer; and
adjust a priority of the service instance based at least on a result of the reachability check of the service instance.

11. A method implemented at a service consumer, the method comprising:
transmitting a discovery request of a service to a network node; and
receiving a discovery result based at least in part on the discovery request from the network node, wherein the discovery result comprises at least address information of a service instance which is registered at the network node and able to provide the service,
wherein the address information of the service instance is resolved by the network node based on a full qualified domain name (FQDN),
wherein an identification information of the service instance is determined according to a profile of the service instance by constructing the identification information of the service instance based at least in part on the profile of the service instance,
wherein receiving the discovery result comprises receiving the FQDN along with the address information of the service instance, and
wherein a priority of the service instance is adjusted based at least on a physical availability of the service instance.

12. The method according to claim 11, wherein the discovery result further comprises the identification information of the service instance.

13. The method according to claim 11, wherein the address information comprises one or more physical addresses.

14. The method according to claim 11, wherein the discovery result further comprises: address information of one or more other service instances which are registered at the network node and able to provide the service, and identification information of the one or more other service instances.

15. The method according to claim 14, wherein the service instance and the one or more other service instances in the discovery result are sorted according to the respective priorities thereof, and wherein the respective priorities are based at least in part on the corresponding address information of the service instance and the one or more other service instances.

16. An apparatus implemented in a service consumer, the apparatus comprising:
one or more processors; and
one or more memories comprising computer program codes, the one or more memories and the computer program codes configured to, with the one or more processors, cause the apparatus at least to:
transmit a discovery request of a service to a network node; and
receive a discovery result based at least in part on the discovery request from the network node, wherein the discovery result comprises at least address information of a service instance which is registered at the network node and able to provide the service,
wherein the address information of the service instance is resolved by the network node based on a full qualified domain name (FQDN),
wherein an identification information of the service instance is determined according to a profile of the service instance by constructing the identification information of the service instance based at least in part on the profile of the service instance,
wherein receiving the discovery result comprises receiving the FQDN along with the address information of the service instance, and
wherein a priority of the service instance is adjusted based at least on a physical availability of the service instance.

17. The method according to claim 1, wherein if the result of the reachability check is unreachable, the priority of the service instance is decreased.

18. The method according to claim 11, wherein if the physical availability is null, the priority of the service instance is decreased.

* * * * *